United States Patent [19]

Chin

[11] Patent Number: 4,986,897

[45] Date of Patent: Jan. 22, 1991

[54] CATALYTIC CONVERSION OF $NO_x$ WITH NH3

[75] Inventor: Arthur A. Chin, Cherry Hill, N.J.

[73] Assignee: Mobil Oil Corporation, Fairfax, Va.

[21] Appl. No.: 458,054

[22] Filed: Dec. 28, 1989

[51] Int. Cl.$^5$ ............................................. C10G 11/18
[52] U.S. Cl. ..................................... 208/113; 208/121; 208/149; 423/239; 502/41
[58] Field of Search ............... 208/113, 121, 120, 149, 208/52 CT; 423/239; 502/41

[56] References Cited

U.S. PATENT DOCUMENTS

| | | | |
|---|---|---|---|
| 3,545,917 | 12/1970 | Stephens | 423/239 |
| 4,060,589 | 11/1977 | Hass et al. | 423/239 |
| 4,124,536 | 11/1978 | Itoh et al. | 502/245 |
| 4,235,704 | 11/1980 | Luckenbach | 208/113 |
| 4,434,147 | 2/1984 | Dimpfl et al. | 258/254 R |
| 4,521,389 | 6/1985 | Blanton, Jr. et al. | 208/120 |
| 4,778,665 | 10/1988 | Krishnamurthy | 208/120 |
| 4,789,531 | 12/1988 | Eichlotz et al. | 423/239 |
| 4,812,430 | 3/1989 | Child | 502/42 |
| 4,812,431 | 3/1989 | Child | 502/42 |
| 4,828,680 | 5/1989 | Green et al. | 208/120 |
| 4,847,054 | 7/1989 | Weisweiler | 502/41 |
| 4,847,058 | 7/1989 | Odenbrand et al. | 423/239 |
| 4,855,116 | 8/1989 | Richter et al. | 208/120 |

*Primary Examiner*—Anthony McFarlane
*Attorney, Agent, or Firm*—Alexander J. McKillop; Charles J. Speciale; Richard D. Stone

[57] ABSTRACT

Oxides of nitrogen ($NO_x$) emissions are catalytically reduced by contacting a flue gas containing $NO_x$ with ammonia or an ammonia precursor in the presence of a catalyst effective for promoting the reduction of $NO_x$ with ammonia in oxidizing atmospheres, such as those in FCC catalyst regenerators. Bismuth oxides on a support are the preferred $NO_x$ reduction catalyst. The process is especially useful in reducing $NO_x$ emissions from fluidized catalytic cracking units.

17 Claims, No Drawings

CATALYTIC CONVERSION OF NX$_x$ WITH NH3

BACKGROUND OF THE INVENTION

1. Field of the Invention

The invention relates to catalytic reduction of oxides of nitrogen, NO$_x$, with ammonia.

2. Description of Related Art

The presence of NO$_x$, or oxides of nitrogen, in flue gas streams, is a pervasive problem. Several powerful ways have been developed to deal with the problem. A non-catalytic approach, using carbonaceous substances to reduce NO$_x$ will be reviewed first, followed by a review of several ammonia-based processes.

In Green et al, U.S. Pat. No. 4,828,680, which is incorporated herein by reference, the level of NO$_x$ emissions from a fluidized catalytic cracking (FCC) unit was reduced by incorporating carbonaceous particles such as sponge coke or coal into the circulating inventory of cracking catalyst. The carbonaceous particle performed several functions, selectively absorbing metal contaminants in the feed and also reducing NO$_x$ emissions in certain instances.

This approach is most suited to FCC units, where large volumes of coal or coke-containing particles can be easily handled. Some modification of the FCC unit may be necessary, and the reduction in NO$_x$ emissions may not be as great as desired.

It is also known to react NO$_x$ in flue gas with NH3. NH3 is a very selective reducing agent, which does not react rapidly with the excess oxygen which may be present in the flue gas.

Two types of NH3 process have evolved, thermal and catalytic.

Thermal processes, such as the Exxon Thermal DeNO$_x$ process, generally operate as homogeneous gas-phase processes at very high temperatures, typically around 1550°-1900° F. More details of such a process are disclosed by Lyon, R. K., Int. J. Chem. Kinet., 3, 315, 1976, which is incorporated herein by reference.

The catalytic systems which have been developed usually operate at much lower temperatures, typically at 300°-850° F. These temperatures are typical of flue gas streams. Unfortunately, the catalysts used in these processes are readily fouled, or the process lines plugged, by catalyst fines which are an integral part of FCC regenerator flue gas.

Perhaps one reason why NH3 has not been added commercially to FCC regenerators is the possibility that the added ammonia, in the conditions experienced in the typical FCC regenerator, could actually increase the NO$_x$ emissions, NH3, in the presence of O$_2$ at temperatures above 900° F., can be oxidized to form NO$_x$, when catalysts such as V$_2$O$_5$ are present. This was reported by Bosch, H and Janssen, F, Catalysis Today, 4(2), 1987. Direct addition of such catalyst, V$_2$O$_5$, to FCC regenerators is undesirable because such materials are poisons to the FCC process, and because the FCC regenerator environment, in the presence of such highly oxidized vanadium catalysts, could convert NH3 to NO$_x$ I wanted a way to take advantage of the selective DeNO$_x$ capability of NH3, but without operating at the high temperatures required by the thermal systems, and using a catalyst system which would be compatible with the contaminants found in FCC regenerator and other similar flue gas streams. Ideally, I wanted a process which could be added on to, or incorporated into, an existing NO$_x$ generator, such as an FCC regenerator, without adding greatly to the capital cost of the unit. I especially wanted to have a way to safely add NH3 to an FCC regenerator flue gas stream, in a way which would reduce NO$_x$ emissions, without intermittently adding NH3 to the atmosphere as unit operation changed.

I discovered that the reduction of NO$_x$ emissions by contact with NH3 could be greatly improved in an FCC unit by adding a NO$_x$ conversion catalyst. With the use of an NO$_x$ conversion catalyst, the process became one which could be used for stack gas cleanup in general, and which was especially useful in FCC units.

BRIEF SUMMARY OF THE INVENTION

Accordingly the present invention provides a process for reducing the nitrogen oxides (NO$_x$) content of a flue gas stream containing NO$_x$ produced by a combustion process comprising removing said flue gas stream from said combustion process, contacting, in a NO$_x$ reduction zone, said flue gas stream with ammonia or an ammonia precursor and a catalytically effective amount of a catalyst effective to reduce NO$_x$ to nitrogen in the presence of ammonia to reduce the content of NO$_x$ in said flue gas and produce a flue gas with a reduced content of NO$_x$.

In another embodiment, the present invention provides a process for reducing the nitrogen oxides (NO$_x$) content of a flue gas stream containing NO$_x$ produced by a fluidized catalytic cracking (FCC) unit operating with a circulating inventory of FCC catalyst which circulates between a FCC reactor which catalytically cracks a hydrocarbon feed to produce lighter products and spent catalyst, and wherein the spent catalyst is regenerated in an FCC regenerator to produce regenerated catalyst and flue gas comprising NO$_x$ comprising adding to the circulating inventory of FCC catalyst a catalytically effective amount of a DeNO$_x$ catalyst having activity to reduce NO$_x$ by contact with NH3 in the oxidizing conditions existing in the FCC regenerator, and adding to the FCC regenerator ammonia or an ammonia precursor in an amount sufficient to reduce at least a portion of the NO$_x$ present in the flue gas.

In a more limited embodiment the present invention provides a process for reducing the nitrogen oxides (NO$_x$) content of a flue gas stream containing NO$_x$ produced by a fluidized catalytic cracking (FCC) unit operating with a circulating inventory of FCC catalyst which circulates between a FCC reactor which catalytically cracks a hydrocarbon feed to produce lighter products and spent catalyst, and wherein the spent catalyst is regenerated in an FCC regenerator to produce regenerated catalyst and flue gas comprising NO$_x$ comprising adding to the circulating inventory of FCC catalyst an additive comprising bismuth oxides on a support, said additive being present in an amount and form sufficient to add from 0.5 to 5 wt % bismuth, on an elemental metal basis, to the circulating inventory of FCC catalyst.

DETAILED DESCRIPTION

The process of the present invention can be downstream of or be an integral part of combustion processes which generate NO$_x$ containing flue gas. The chemical and physical properties of suitable NO$_x$ conversion catalysts will be discussed. This is followed with a brief review of NO$_x$ generating combustion processes including a more detailed review of the FCC process because

$NO_x$ CATALYST

The process of the present invention can use any catalytic material which will promote the catalytic reduction of NO, $NO_2$, etc. in the presence of ammonia. Preferably the catalyst will not oxidize the ammonia to oxides of nitrogen. The reaction mechanism is not completely understood, but it is believed that the $NO_x$ catalyst promotes some reaction between $NO_x$ and the ammonia.

The $NO_x$ reduction catalyst can be any material which has activity for promoting the reaction of $NO_x$ with ammonia. It is believed that many materials which are effective for promoting catalytic reduction of NO with CO may also be used in the process of the present invention.

Bismuth and oxides and compounds thereof are effective and preferred as $NO_x$ reduction catalysts. Oxides of Group IIIB metals, such as lanthanum and yttrium have also shown significant $NO_x$ reduction activity. The Group IVA and VA metals (Ge, Sn, Pb, Sb) and zinc all can be used as $NO_x$ reduction catalysts.

A simple screening test can be used in a laboratory to determine if a material has the desired $NO_x$ reduction properties, by passing an $NO_x$ containing flue gas and NH3 through a fixed or fluidized bed of solids containing $NO_x$ catalyst and analyzing the flue gas for $NO_x$ content.

The $NO_x$ reduction catalyst can be, and preferably is, maintained in the form of a separate additive particle. It is also possible to deposit a suitable NO reduction catalyst on solids already present, such as FCC catalyst, either in situ or ex situ. In situ preparation of catalyst can be made by spraying a soluble or colloidally dispersed solution of, e.g., a bismuth compound, onto or through a bed of FCC catalyst material. The FCC catalyst may be impregnated ex-situ with $NO_x$ reduction catalyst, or small amounts of the NO reduction catalyst can be physically incorporated onto another porous support which need not be combustible. The $NO_x$ reduction catalyst can have the same particle size distribution as the other solids which may be present, or may be made to the size desired. Conventional methods of catalyst formation may be used to form a $NO_x$ reduction catalyst of the desired size.

When the $NO_x$ reduction catalyst is used as a pure, flue gas treatment process, the $NO_x$ reduction catalyst should be chosen for maximum effectiveness. When the $NO_x$ reduction catalyst is to be incorporated into the process unit producing the flue gas, the possible adverse effects of the $NO_x$ reduction catalyst on the process unit should be considered.

Use of a $NO_x$ reduction catalyst in a catalytic cracking unit presents the most difficult task. The $NO_x$ catalyst should be effective for $NO_x$ reduction, while having little or no adverse effect in the catalytic cracking reaction zone. The $DeNO_x$ catalyst should not oxidize ammonia to oxides of nitrogen in the regenerator, which has a high temperature and an oxidizing environment. A $DeNO_x$ catalyst can be used in an FCC unit in at least two ways, either by incorporating the $NO_x$ reduction catalyst on a support and/or in a manner where the reduction catalyst is isolated from the FCC reaction zone, or by using an $NO_x$ reduction catalyst which has little catalytic activity in the catalytic cracking reaction zone.

$NO_X$ GENERATING PROCESSES

The process of the present invention can be used to reduce $NO_x$ emissions from any source. $NO_x$ emissions are believed to be produced, to some degree, in every combustion process. In coal and oil burning power plants some $NO_x$ emissions are always formed. The problem is especially severe in brown coal combustion.

The process of the present invention is especially useful for reducing $NO_x$ emissions produced in the regenerator associated with a fluidized catalytic cracking unit. More details of the problem of $NO_x$ emissions from FCC regenerators, and the benefits of NO reduction via contact with carbonaceous particles are disclosed in U.S. Pat. No. 4,828,680 (Green et al) which has been incorporated herein by reference.

All approaches, pure flue gas treatment, FCC use with isolated $NO_x$ reduction catalyst, and FCC use with $NO_x$ catalyst circulating with the catalyst inventory, will be discussed in more detail hereafter.

FLUE GAS TREATMENT

The process of the present invention works well to clean up flue gas from any source. In this embodiment, the flue gas treatment is downstream, and remote from, the combustion process which generates the $NO_x$-containing flue gas.

The $DeNO_x$ catalyst is preferably disposed as the form of a fixed or fluidized or moving bed of solids through which the flue gas to be treated, and the added ammonia, passes.

For simplicity, and when pressure drop is not a great concern, a simple fixed bed reactor design may be used with the catalyst disposed as a single or multiple fixed beds of catalyst. Radial flow fixed bed reactor designs will allow larger volumes of gas to be treated at lower pressure drop.

Use of fixed or moving bed of catalyst to treat the $NO_x$-containing flue gas will frequently have the incidental benefit of acting as a particle trap to remove particulates which may be present in the flue gas.

Fluidized bed contacting devices are preferred for low pressure drop. A fixed, fluidized bed may be used wherein the relatively dense fluidized bed of $DeNO_x$ catalyst is maintained as a fluidized bed by the $NO_x$-containing gas. Alternatively, a dilute phase processing of the gas is also possible, with either upflow or downflow operation contemplated.

FCC REGENERATOR USE—$NO_x$ CAT ISOLATED

The process of the present invention can be effectively used in any FCC regenerator without regard to possible adverse effects of the $DeNO_x$ catalyst in the FCC reactor, providing that the $NO_x$ reduction catalyst is used in a form and manner which keeps it out of the FCC reaction zone.

This can be done in several ways, some of which involve use of very small particles of $NO_x$ reduction catalyst, and some of which involve use of relatively large, low density $NO_x$ reduction catalyst particles.

Disposing the $NO_x$ reduction catalyst on large, hollow spheres, will cause the $NO_x$ reduction catalyst to float to the top of a single, dense bed regenerator and tend to remain there. The particles are large and light and tend to float easily on the fluidized bed. They are not readily swept up into the dilute phase of the process so they tend to stay within the FCC regenerator.

An alternative approach, which may require some regenerator modification, is to dispose the $NO_x$ reduction catalyst on relatively small sized particles, e.g., 10-40 micron size particles. These smaller size particles can be retained, to a great extent, within the regenerator using the conventional cyclone separators. Because of their small size, they tend to segregate and collect in the upper portions of the FCC regenerator bed. It is possible, by supplying additional stages of cyclone separation, and selectively recycling the fines, from, e.g., the second or third stage cyclone to the upper portion of the catalyst bed in the regenerator, to cause a significant accumulation of $NO_x$ reduction catalyst in the upper portions of the bed.

More details about both approaches regards catalyst segregation are disclosed in U.S. Pat. No. 4,812,430 and U.S. Pat. No. 4,812,431, which are incorporated herein by reference.

FCC-CIRCULATING $NO_x$ CATALYST

It is also possible, and will be preferred in many instances, to practice the present invention using a $DeNO_x$ catalyst which is compatible with the catalytic cracking catalyst and circulates as an integral part of the FCC catalyst inventory. Usually such $DeNO_x$ catalysts will reduce $NO_x$ emissions somewhat by their mere presence. The addition of ammonia or an ammonia precursor to the regenerator will then permit a further significant reduction in the $NO_x$ content of the regenerator flue gas.

An important consideration in this approach is to use an $NO_x$ reduction catalyst which will cause no adverse reaction in the FCC reactor. This makes catalyst selection much harder, as compared to the pure flue gas treatment process where possible adverse effects of a $DeNO_x$ catalyst on the cracking process can be ignored. It also makes catalyst handling simpler, because now the $DeNO_x$ catalyst can have physical properties which permit it to circulate with the catalyst inventory of an FCC unit.

The $NO_x$ reduction catalyst can be impregnated onto a portion of the circulating catalyst inventory, so long as the final form of the catalyst is one in which $NO_x$ reduction will be achieved when ammonia is added to the FCC regenerator.

Bismuth oxide compounds or bismuth oxides, on separate additive particles are especially preferred for use herein. These materials exhibit very little adverse effect in the cracking reactor. Separate particles of bismuth additive do very little in the cracking reactor. These bismuth additives do not passivate metals which may be present on the feed or in the catalyst. These bismuth additives have only a slight hydrogenation/-dehydrogenation function which can usually be tolerated in most existing FCC units.

Not all forms of bismuth are suitable for use herein. Bismuth addition is currently practiced or proposed for metals passivation in FCC units. For metals passivation, a hydrocarbon soluble bismuth compound may be added to the feed to passivate nickel and vanadium compounds present in the feed or already deposited on the catalyst. Bismuth in such a form is believed to be effective at passivating nickel and vanadium, but such bismuth shows little or no $NO_x$ reduction capability.

Although bismuth oxides and compounds thereof are preferred $NO_x$ reduction catalysts, other $NO_x$ reducing additives which are effective to reduce $NO_x$ emissions in the presence of ammonia without adversely affecting the catalytic cracking reaction can also be used. Oxides of Group IIIB metals, such as lanthanum and yttrium have shown significant $NO_x$ reduction activity. The Group IVA and VA metals (Ge, Sn, Pb, Sb) and zinc are all believed usable as $NO_x$ reduction catalysts.

In this embodiment, with a circulating $DeNO_x$ catalyst, it is also important to select a $DeNO_x$ catalyst which will not oxidize the ammonia in the regenerator. Some of the conventional SCR, or Selective Catalytic Reduction, catalysts such as $V_2O_5$, will oxidize ammonia to NO in the conditions which exist in most, if not all, FCC regenerators.

AMMONIA SOURCE

Ammonia, or an ammonia precursor such as urea or other compound or material which breaks down at the gas treatment conditions used to form ammonia, may be used. Ammonia is inexpensive, easy to add, and is therefore preferred.

The ammonia, or a precursor thereof, may be added to the flue gas, or to the burning zone where the $NO_x$ is being formed.

In an FCC unit, the ammonia is preferably added downstream of the point of most of the carbon burning. In a bubbling bed regenerator, or single fixed bed regenerator, the ammonia or precursor can be added to the dilute phase or to a middle or upper elevation of the bubbling dense bed. This will be more effective than adding the ammonia to the base of the regenerator, where surface temperatures of the catalyst will be higher, and where free oxygen content will be relatively high. In high efficiency regenerators, with a coke combustor, dilute phase transport riser, and second dense bed which hold regenerated catalyst, the ammonia or precursor is preferably added to the transport riser, or to or just above the second dense bed. In a multistage regenerator, the ammonia or precursor should be added to a downstream regeneration stage.

EXAMPLES

EXAMPLE 1

A bismuth-containing additive was prepared using the following procedure. An impregnation was prepared containing 2340 g $(Bi(NO_3)_3 \cdot 5H_2O$, 847 grams concentrated (70%) $HNO_3$, and 3040 g $H_2O$. This was added to 4550 g of Davison Super-D matrix and the mixture agitated for 30 minutes. The slurry was filtered without washing, dried at 250° F., and calcined at 1200° F. for 2 hours. The finished additive contained 10.1 wt % Bi. Properties of the Super-D matrix and Bi additive are given in Table 1.

TABLE 1

| | Super-D Matrix | Bi Additive |
|---|---|---|
| Physical | | |
| Real Density, g/cm$^3$ | 2.51 | 2.71 |
| Part Density, g/cm$^3$ | 1.51 | 1.71 |
| Port Volume, cm$_2$/g | 0.26 | 0.22 |
| Surface Area, m$^2$/g | 95 | 30 |
| Average Particle Size, | 82 | 84 |
| Chemical | | |
| SiO$_2$, wt % | 52 | |
| Al$_2$O$_3$, wt % | 29 | |
| Na, ppm | 490 | |
| Fe, ppm | 5400 | |
| Ni, ppm | 90 | |
| V, ppm | 60 | |
| Bi, wt % | — | 10.1 |

EXAMPLE 2

The ability of bismuth to enhance the rate of $NO_x$ reduction by $NH_3$ was tested under simulated FCC regeneration conditions using a bench-scale, fluidized bed reactor. 200 cc/min of a gas mixture containing about 900 ppm NO (balance $N_2$) was passed through a catalyst bed, containing 10 g clean-burned commercial FCC catalyst (properties given in Table 2) and 0.5 g of the bismuth additive from Ex. 1, at 1300.F. $NH_3$ was then added at 1000, 2000, and 4000 ppm. The effect of $O_2$ on $NH_3$ was determined by adding 1 vol% $O_2$ to the 4000 ppm $NH_3$ run. To determine NO reduction, inlet and outlet $NO_x$ concentrations were measured (after 20 min run time) using an Antek 703C chemiluminescent $NO_x$ analyzer. For comparison, identical runs were made without using the bismuth additive. The results, summarized in Table 3, show that with Bi, over 90% $NH_3$ reduction is achieved even in the presence of added $O_2$. There was also insignificant conversion of $NH_3$ to $NO_x$ in the presence of oxygen with Bi catalyst at 1300° F. Without Bi, negligible reduction occurred until 4000 ppm $NH_3$ was added (47% NO conversion). However, $NO_x$ conversion dropped to 25% in the presence of $O_2$.

TABLE 2

| Clean-burned FCC Catalyst Properties | |
|---|---|
| Surface Area, $M^2/g$ | 80 |
| Density, g/cc | |
| Packed | 0.92 |
| Loose | 0.85 |
| $Al_2O_3$, wt % | 46.0 |
| Nitrogen, ppm | 190 |
| Sulfur, wt % | <0.005 |
| Nickel, ppm | 3200 |
| Vanadium, ppm | 590 |
| Copper, ppm | 43 |
| Iron, ppm | 9500 |
| Sodium, ppm | 2800 |
| Platinum, ppm | 0.43 |

TABLE 3

Effect of Bismuth on $NO_x$ Reduction by $NH_3$

| | Reactor Inlet | | | Outlet | |
|---|---|---|---|---|---|
| Run # | NO (ppm) | $NH_3$ (ppm) | $O_2$ (vol %) | NO (ppm) | % $NO_x$ Reduction |
| 5% Bi additive: | | | | | |
| 1 | 911 | 0 | 0 | 895 | 2 |
| 2 | 878 | 1000 | 0 | 38 | 96 |
| 3 | 857 | 2000 | 0 | 46 | 95 |
| 4 | 819 | 4000 | 0 | 33 | 96 |
| 5 | 824 | 4000 | 1 | 89 | 89 |
| No additive: | | | | | |
| 6 | 874 | 0 | 0 | 890 | (+2) |
| 7 | 858 | 1000 | 0 | 863 | (+1) |
| 8 | 866 | 2000 | 0 | 863 | 0 |
| 9 | 836 | 4000 | 0 | 440 | 47 |
| 10 | 944 | 4000 | 1 | 712 | 25 |

The data in Table 3 show that my bismuth additive funtions well in the presence of oxygen to convert NO to nitrogen. The data in table 3, runs 1-5, probably reflect two competing reactions:

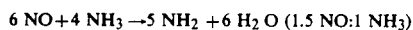

6 NO + 4 $NH_3$ → 5 $NH_2$ + 6 $H_2O$ (1.5 NO:1 $NH_3$)

4 NO + 4 $NH_3$ + $O_2$ → 4 $NH_2$ + 6 $H_2O$ (1 NO:1 $NH_3$)

Although it is preferred to operate with insufficient ammonia, to reduce the cost of ammonia addition and reduce the chance of adding free ammonia to the flue gas, the data reflect operation with excess ammonia. Comparing run 4 (no oxygen) to run 5 (with oxygen), it is apparent that my bismuth additive, even in the presence of a gross excess of ammonia, retains the ability to drastically reduce the NO content of the flue gas.

The data also do not reflect conditions that exist in a typical FCC regenerator, in that the catalyst present was clean burned so that it contained little or no carbon. In an actual FCC regenerator, there would be some coke or carbon on catalyst, some CO would be present in at least some portions of the bed, and some of the combustion would occur at localized low temperatures where spent catalyst is added to the bed. All of these factors (coke on catalyst, CO, low temperatures) would reduce somewhat the NO content of the flue gas. The experimental results thus do not simulate an FCC regenerator, but they do prove the ability of my bismuth additive to reduce NO in the presence of hot, regenerated FCC catalyst in the presence of oxygen.

The process of the present invention provides a powerful way to reduce $NO_x$ emissions from any source, and especially from FCC regenerators. The preferred $DeNO_x$ catalyst, bismuth additives, can be introduced into an FCC unit without disrupting unit operation. The presence of the $DeNO_x$ catalyst permits $NH_3$, or a precursor thereof, to be added to the unit without undue fear that the flue gas will contain $NH_3$. This is because the conditions in the FCC regenerator are ideal for rapid reaction of $NH_3$ with $NO_x$, provided that a suitable $DeNO_x$ catalyst is present.

$NH_3$ usage is so efficient in my process that it works best with a stoichiometrically insufficient amount of $NH_3$ added. Preferably the $NO_x$ is always in excess of the $NH_3$ required for complete reduction of $NO_x$ to $N_2$. Phrased another way, preferably from 10 to 95%, and most preferably from 45 to 90% of the $NH_3$ required for complete reduction of $NO_x$ is added to the flue gas. This ensures that the $NH_3$ will be rapidly and completely consumed by the $NO_x$ present in the flue gas, and will not be present to a significant extent in the flue gas. The preferred $NO_x$ reduction catalyst, especially the bismuth additive, will still function to reduce $NO_x$ emissions somewhat even after the $NH_3$ is consumed, so the two processes (catalytic reduction with $NH_3$, catalytic reduction with $DeNO_x$ catalyst after the $NH_3$ is exhausted) work well together.

When a powerful $DeNO_x$ catalyst is used, such as separate particles comprising bismuth oxides, very great reductions in $NO_x$ emissions can be achieved. The Bi additive can convert large amounts of $NO_x$ even without any ammonia present, and with ammonia very sharp reductions in $NO_x$ emissions can be achieved.

When $NH_3$ emissions are not a concern it will be beneficial to operate with more $NH_3$ to achieve even lower levels of $NO_x$ emissions, or to reduce the amount of catalyst required. In this situation, operation with 0.5 to 5 moles of $NH_3$ per mole of $NO_x$ is preferred, with operation with 1.0 to 2.0 moles of $NH_3$ per mole of $NO_x$ giving good results.

In an FCC embodiment, operation with 0.05 to 10 wt % $DeNO_x$ catalyst in the circulating catalyst inventory will work, with 0.1 to 5 wt % $DeNO_x$ additive being preferred. When the preferred bismuth additives are used, some $NO_x$ reduction will occur with as little as 0.05 wt % bismuth, on an elemental metal basis, with more efficient $NO_x$ reduction with $NH_3$ occurring when as little as 0.5 wt % bismuth, on an elemental metal basis is present in the equilibrium catalyst (5% additive in equilibrium catalyst, additive containing 10.1 wt % Bi).

The process of the present invention allows the FCC process to be pushed significantly harder, regards heavier, higher nitrogen feeds, without resulting in increases in $NO_x$ emissions. The process of the present invention also permits significant reductions in $NO_x$ emissions to be achieved in existing unit. When using the preferred bismuth additive, the practice of the present invention can be put into practice with practically no capital expense. The only operating expenses are for some bismuth additive, and very small amounts of $NH_3$ or $NH_3$ precursor.

I claim:

1. A process for reducing the nitrogen oxides ($NO_x$) content of a flue gas stream containing $NO_x$ produced by a combustion process comprising:
   (a) removing said flue gas stream from said combustion process,
   (b) contacting, in a $NO_x$ reduction zone, operating at $NO_x$ reduction conditions including a temperature above about 900° F., said flue gas stream with ammonia or an ammonia precursor and a catalytically effective amount of a catalyst comprising bismuth and oxides of bismuth to reduce $NO_x$ to nitrogen in the presence of ammonia and reducing the content of $NO_x$ in said flue gas.

2. The process of claim 1 wherein the $NO_x$ reduction zone operates at a temperature of 900° to 1900° F.

3. The process of claim 1 wherein 10 to 95% of the $NH_3$ required for complete reduction of $NO_x$ is added to the flue gas.

4. The process of claim 1 wherein the ammonia is added by addition of urea to the $NO_x$ reduction zone.

5. The process of claim 1 wherein the $NO_x$ reduction zone operates at a temperature of 1000° to 1400° F., the gas hourly space velocity in the $NO_x$ reduction zone is 100 to 10,000 $hr^{-1}$ and the ammonia or ammonia precursor is added in an amount less than that required to convert $NO_x$ to nitrogen.

6. In a process for reducing the nitrogen oxides ($NO_x$) content of a flue gas stream containing $NO_x$ with a circulating inventory of FCC catalyst circulating between an FCC reactor and an FCC regenerator, said catalyst having an average particle size, an average bulk density, and an average settling velocity, and wherein said FCC catalyst in said FCC reactor catalytically cracks a hydrocarbon feed to produce lighter products and spent catalyst, and wherein the spent catalyst is regenerated at oxidizing conditions in said FCC regenerator by contact with oxygen or an oxygen containing gas to produce regenerated catalyst and flue gas comprising $NO_x$, the improvement comprising:
   a. adding to the circulating inventory of FCC catalyst a $DeNO_x$ catalyst, on a catalyst support which segregates from said circulating catalyst inventory in said regenerator and accumulates in an upper region of said regenerator, having activity to reduce $NO_x$ by contact with $NH_3$ in the oxidizing conditions existing in the FCc regenerator,
   b. adding to the FCC regenerator ammonia or a ammonia precursor in an amount sufficient to reduce at least a portion of the $NO_x$ present in the flue gas.

7. The process of claim 6 wherein the $DeNO_x$ catalyst is on a catalyst support which has a smaller average particle size and a lower settling velocity than said circulating cracking catalyst and wherein said $DeNO_x$ catalyst segregates from said circulating catalyst inventory in said regenerator and accumulates in an upper region of said regenerator.

8. The process of claim 6 wherein in the $DeNO_x$ catalyst is on a catalyst support which has a particle diameter larger than said circulating cracking catalyst, and said support is hollow whereby said $DeNO_x$ catalyst segregates from said circulating catalyst inventory in said regenerator and floats on top of said circulating cracking catalyst in said regenerator.

9. The process of claim 8 wherein the $NO_x$ reduction catalyst is selected from the group of Group IIIB, IVA and Group VA, and zinc elements and compounds thereof.

10. The process of claim 6 wherein the $NO_x$ reduction catalyst comprises bismuth and oxides of bismuth.

11. The process of claim 6 wherein 10 to 95 % of the $NH_3$ required for complete reduction of $NO_x$ is added to the FCC regenerator.

12. The process of claim 6 wherein 45 to 90 % of the $NH_3$ required for complete reduction of $NO_x$ is added to the FCC regenerator.

13. The process of claim 6 wherein the ammonia is added by addition of urea to the regenerator.

14. The process of claim 6 wherein the $DeNO_x$ catalyst is on a catalyst support selected from the group of silica, alumina, silica-alumina, clay, and mixtures thereof.

15. In a process for reducing the nitrogen oxides ($NO_x$) content of a flue gas stream containing $NO_x$ produced by a fluidized catalytic cracking (FCC) unit operating with a circulating inventory of FCC catalyst circulating between an FCC reactor and an FCC regenerator, wherein said catalyst catalytically cracks a hydrocarbon feed in the FCC reactor to produce lighter products and spent catalyst, and wherein the spent catalyst is regenerated in the FCC regenerator to produce regenerated catalyst and flue gas comprising $NO_x$ the improvement comprising:
   a. adding to the circulating inventory of FCC catalyst an additive comprising bismuth oxides on a support, said additive being present in an amount and form sufficient to add from 0.5 to 5 wt % bismuth, on an elemental metal basis, to the circulating inventory of FCC catalyst, and
   b. adding to the FCC regenerator ammonia or an ammonia precursor in an amount sufficient to reduce from 20 to 95% of the $NO_x$ present in the flue gas.

16. The process of claim 15 wherein 10 to 95% of the $NH_3$ required for complete reduction of $NO_x$ is added to the FCC regenerator.

17. The process of claim 15 wherein 45 to 90% of the $NH_x$ required for complete reduction of $NO_x$ is added to the FCC regenerator.

* * * * *